US007759411B2

(12) United States Patent
Aoyama

(10) Patent No.: US 7,759,411 B2
(45) Date of Patent: Jul. 20, 2010

(54) INK COMPOSITION, AND RECORDING METHOD AND RECORDED MATTER USING THE SAME

(75) Inventor: Tetsuya Aoyama, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 148 days.

(21) Appl. No.: 11/392,164

(22) Filed: Mar. 29, 2006

(65) Prior Publication Data

US 2007/0015849 A1 Jan. 18, 2007

(30) Foreign Application Priority Data

Mar. 30, 2005 (JP) ............................ P 2005-100118

(51) Int. Cl.
*C09D 11/00* (2006.01)
*C08K 9/00* (2006.01)
*C08C 19/44* (2006.01)
*C08L 33/06* (2006.01)

(52) U.S. Cl. ................. 523/160; 523/161; 523/200; 524/572; 524/560

(58) Field of Classification Search .............. 523/160, 523/161, 200, 205; 106/31.27, 31.6, 31.75, 106/31.9, 475; 524/495
See application file for complete search history.

(56) References Cited

U.S. PATENT DOCUMENTS

| | | | | |
|---|---|---|---|---|
| 6,727,296 | B1 * | 4/2004 | Pears et al. ................. | 523/160 |
| 2002/0050226 | A1 * | 5/2002 | Oki et al. ................. | 106/31.46 |
| 2002/0075369 | A1 * | 6/2002 | Ota et al. ................... | 347/100 |
| 2003/0144378 | A1 * | 7/2003 | Mizushima et al. ......... | 523/160 |
| 2004/0233263 | A1 * | 11/2004 | Goto et al. ................. | 347/100 |
| 2004/0259978 | A1 * | 12/2004 | Tani et al. .................. | 523/160 |

FOREIGN PATENT DOCUMENTS

| | | |
|---|---|---|
| JP | 11-320924 | 11/1999 |
| JP | 2002-20673 | 1/2002 |
| JP | 2004-75988 | 3/2004 |

OTHER PUBLICATIONS

Computer-Generated English Translation and Patent Abstracts of Japan of JP 2004-75988 dated Mar. 11, 2004.
Computer-Generated English Translation and Patent Abstracts of Japan of JP 2002-20673 dated Jan. 23, 2002.
Computer-Generated English Translation of Specification and Claims and Patent Abstracts of Japan of 11-320924 dated Nov. 24, 1999.

* cited by examiner

*Primary Examiner*—Vasu Jagannathan
*Assistant Examiner*—Alexander C Kollias
(74) *Attorney, Agent, or Firm*—Ladas and Parry LLP

(57) ABSTRACT

The present invention provides an ink composition comprising at least a pigment, a polymer which encapsulates the pigment to make the pigment dispersible in the ink composition, a multivalent metal ion and water, wherein the polymer is a vinyl polymer obtained by polymerizing: A) at least one specific vinyl monomer, B) a monomer having a salt-forming group, C) a macromer having a number average molecular weight of 500 to 500,000, and D) a monomer copolymerizable with the monomers A), B) and C), and wherein the content of the multivalent metal ion is from 3 to 500 ppm based on the total amount of the ink composition. Also disclosed are an ink jet recording method using the ink composition and recorded matter obtained by the ink jet recording method.

10 Claims, No Drawings

INK COMPOSITION, AND RECORDING METHOD AND RECORDED MATTER USING THE SAME

FIELD OF THE INVENTION

The present invention relates to an ink composition which can realize printing in which, above all, excellent color developing properties to plain paper and excellent glossiness to glossy paper are compatible with each other, while satisfying storage stability and print stability, and a recording method and recorded matter using the same.

BACKGROUND OF THE INVENTION

The ink jet recording method is a printing method in which droplets of an ink are allowed to fly and adhered to a recording medium such as paper to perform printing. With recent innovative improvements in inkjet recording technology, the ink-jet recording method has also been applied in the field of high-definition printing which has hitherto been achieved only by silver halide photography and offset printing. The ink jet printing has been made not only to plain paper, but also to glossy paper having high glossiness such as photographic printing paper or art paper.

A water-soluble dye has hitherto been often used as a coloring agent in an ink composition used in the ink jet recording method. A water-soluble dye ink can also be printed on various recording media, and excellent glossiness can be obtained in recording onto glossy paper. On the other hand, however, the aqueous dye ink has the drawback of being poor in light resistance, gas resistance and water resistance, so that the use of a pigment as the coloring agent has been studied in recent ink development.

An aqueous pigment ink is a dispersion in which fine pigment particles having a definite particle size have been uniformly dispersed in a water solvent, and an ink film containing the pigment is formed on a recording medium after printing on the recording medium. Accordingly, it exhibits excellent color developing properties on various recording media, particularly on plain paper. However, when it is printed on a recording medium whose surface is smoothly treated, such as glossy paper, there has been the problem of impairing glossiness of a recorded area by diffused reflection of light due to the fine pigment particles in the ink film. Further, in order to improve glossiness of the recorded area, various gloss imparting agents are allowed to be contained in the ink composition in some cases. However, there have been the problems of deteriorated storage stability of the ink composition, deteriorated print stability and decreased print density on plain paper.

To such problems, JP-A-2004-75988 (patent document 1) proposes a pigment ink in which a water dispersion of a fine water-insoluble vinyl polymer particles is used, whereby printing high in color development and excellent in glossiness is possible. However, in the ink composition using the above-mentioned water dispersion, the ink composition excellent in color developing properties on plain paper is deteriorated in glossiness on glossy paper, and conversely, the ink composition excellent in glossiness on glossy paper is deteriorated in color developing properties on plain paper. Thus, there has been the problem of failing to sufficiently satisfy high color developing properties and high glossiness at the same time by one ink composition. An ink composition having both of high color developing properties to plain paper and high glossiness to glossy paper at the same time while satisfying storage stability of the ink composition and print stability has not been obtained yet.

Patent Document 1: JP-A-2004-75988

SUMMARY OF THE INVENTION

Now, the present inventors found that printing with both excellent color developing properties to plain paper and excellent glossiness to glossy paper can be realized by an ink composition comprising a pigment, a vinyl polymer having a specific structure which encapsulates the pigment to make the pigment dispersible in an ink composition, a specific amount of a multivalent metal ion and water. The invention is based on such a finding.

Accordingly, an object of the invention is to provide an ink composition which can realize printing in which excellent color developing properties to plain paper and excellent glossiness to glossy paper are compatible with each other, while securing storage stability and print stability.

Another object of the invention is to provide a recording method and recorded matter using the ink composition.

Other objects and effects of the invention will become apparent from the following description.

The ink composition according to the invention comprises at least a pigment, a polymer which encapsulates the pigment and to make the pigment dispersible in the ink composition, a multivalent metal ion and water, wherein the above-mentioned polymer is a vinyl polymer obtained by polymerizing:

A) at least one monomer selected from the group consisting of:

monomer A1 represented by formula (I):

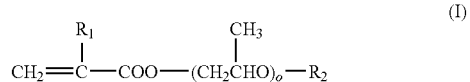

wherein $R^1$ represents a hydrogen atom or a methyl group, $R^2$ represents a hydrogen atom, an alkyl group having 1 to 20 carbon atoms or an alkylphenyl group having 1 to 9 carbon atoms, and o represents a number of 1 to 30;

monomer A2 represented by formula (II):

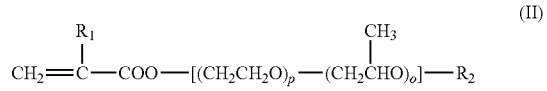

wherein $R^1$, $R^2$ and o have the same meanings as defined in formula (I), p represents a number of 1 to 30, the form of addition of oxyethylene groups and oxypropylene groups in brackets may be either block addition or random addition; and monomer A3 represented by formula (III):

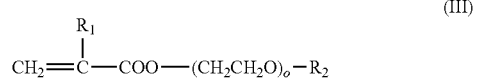

wherein $R^1$, $R^2$ and o have the same meanings as defined in formula (I);

B) a monomer having a salt-forming group;

C) a macromer having a number average molecular weight of 500 to 500,000; and

D) a monomer copolymerizable with the above-mentioned monomers A), B) and C), and wherein the content of the above-mentioned multivalent metal ion is from 3 to 500 ppm based on the total amount of the ink composition.

The ink composition according to the invention can realize printing in which excellent color developing properties to plain paper and excellent glossiness to glossy paper are compatible with each other at the same time, while satisfying storage stability and print stability.

DETAILED DESCRIPTION OF THE INVENTION

The ink composition according to the invention contains a pigment, a polymer having a specific structure which encapsulates the pigment to make the pigment dispersible in the ink composition, a specific amount of a multivalent metal ion and water as essential constituents.

In the invention, the pigment is encapsulated by the vinyl polymer, resulting in taking the particle form. The particles are prepared from the pigment and polymer described later. Although details thereof will be described later, the particles encapsulating the pigment can be obtained, in brief, by mixing and dispersing the pigment, the polymer dissolved or dispersed in an organic solvent, water and optionally a neutralizing agent, removing the above-mentioned organic solvent, and dispersing the desolvated matter. The respective components constituting the ink composition will be described below.

(Pigment)

As the pigment contained in the ink composition of the invention, an organic pigment or inorganic pigment which has hitherto been used in an ink jet ink composition can be used.

The organic pigments include azo pigments (for example, including azo lake, an insoluble azo pigment, a condensed azo pigment, a chelate azo pigment and the like), polycyclic pigments (for example, a phthalocyanine pigment, a perylene pigment, a perinone pigment, an anthraquinone pigment, a quinacridone pigment, a dioxazine pigment, a thioindigo pigment, an isoindolinone pigment, a quinophthalone pigment and the like), nitro pigments, nitroso pigments, aniline black and the like. Specific examples of the pigments include, as yellow pigments, C.I. Pigment Yellow 74, 93, 109, 110, 128, 138, 150, 151, 154, 155, 180 and 185; as magenta pigments, C.I. Pigment Red 122 and 202, and C.I. Pigment Violet 19; as cyan pigments, C.I. Pigment Blue 15, 15:1, 15:2, 15:3, 15:4, 16 and 60; and as pigments other than the yellow, magenta and cyan pigments, C.I. Pigment Green 7, 10, 36 and 37, C.I. Pigment Brown 3, 5, 25 and 26, C.I. Pigment Orange 1, 2, 5, 7, 13, 14, 15, 16, 34, 36 and 38, C.I. Pigment Black 1 and the like. The inorganic pigments include for example, carbon black, metal oxides, metal sulfides, metal chlorides and the like.

In the ink composition according to the invention, the magenta pigment is preferably used, and C.I. Pigment Violet 19 is more preferably used, from the viewpoints of color developing properties and glassiness.

(Vinyl Polymer)

The polymer used in the ink composition according to the invention is a vinyl polymer obtained by polymerizing the following monomers A) to D).

(1) Monomer A):

Monomer A) means at least one monomer selected from monomer A1 represented by the following formula (I), monomer A2 represented by the following formula (II) and monomer A3 represented by the following formula (III). Formula (I):

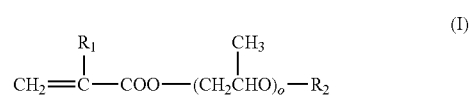

wherein $R^1$ represents a hydrogen atom or a methyl group, $R^2$ represents a hydrogen atom, an alkyl group having 1 to 20 carbon atoms or an alkylphenyl group having 1 to 9 carbon atoms, and o represents a number of 1 to 30.

Formula (II):

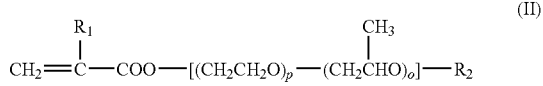

wherein $R^1$, $R^2$ and o have the same meanings as defined in formula (I), p represents a number of 1 to 30, the form of addition of oxyethylene groups and oxypropylene groups in brackets may be either block addition or random addition.

Formula (III):

wherein $R^1$, $R^2$ and o have the same meanings as defined in formula (I).

Specific examples of monomers A1 include polypropylene glycol mono(meth)acrylate and the like.

Specific examples of monomers A2 include ethylene glycol-propylene glycol (meth)acrylate, poly(ethylene glycol-propylene glycol) mono(meth)acrylate, octoxypoly-ethylene glycol-polypropylene glycol mono(meth)acrylate, octoxypoly(ethylene glycol-propylene glycol) mono(meth)-acrylate, stearoxypolyethylene glycol-polypropylene glycol mono(meth)acrylate, stearoxypoly(ethylene glycol-propylene glycol) mono(meth)acrylate, nonylphenoxypolyethylene glycol-polypropylene glycol mono(meth)acrylate, nonylphenoxypoly(ethylene glycol-propylene glycol) mono (meth)-acrylate and the like. These can be used either alone or as a mixture of two or more thereof.

Examples of commercially available monomers A1 and A2 include Blemmer PP-100, PP-500, PP-800, AP-150, AP-400, AP-550, AP-800, 50PEP-300, 70PEP-350B, APE series, 330PPT-800, 50PPT-800, 70PPT-800, APT series, 10PPB-50B, 10APB-500B, 50POEP-800B, 50AOEP-800B, ASEP series, PNEP series, PNPE series, 43ANEP-500 and 70ANEP-550 manufactured by NOF Corporation, and the like.

Specific examples of monomers A3 include polyethylene glycol mono(meth)acrylate.

Specific examples of commercially available monomers A3 include NK ESTER M-20G, 40G, 90G and 230G manufactured by Shin-Nakamura Chemical Co., Ltd., Blemmer PE series, PME-100, 200, 400 and 1000 manufactured by NOF Corporation, and the like.

From the viewpoints of color developing properties and ink viscosity, the content of monomer A) in the vinyl polymer is preferably from 5 to 45% by weight, and more preferably from 5 to 35% by weight.

(2) Monomer B):

Monomer B) is a monomer comprising a salt-forming group.

As this salt-forming group-containing monomer, an anionic monomer or a cationic monomer is preferably used. The anionic monomers and cationic monomers can each be used either alone or as a mixture of two or more thereof.

Specific examples of the anionic monomers include at least one selected form the group consisting of an unsaturated carboxylic acid monomer, an unsaturated sulfonic acid monomer and an unsaturated phosphoric acid monomer.

Specific examples of the unsaturated carboxylic acid monomers include, for example, acrylic acid, methacrylic acid, crotonic acid, itaconic acid, maleic acid, fumaric acid, citraconic acid, 2-methacryloyloxymethylsuccinic acid and the like. These can be used either alone or as a mixture of two or more thereof.

As the anionic monomer, preferred is the unsaturated carboxylic acid monomer, and more preferred are acrylic acid and methacrylic acid, from the viewpoints of ink viscosity and print stability.

The cationic monomers include polyvinylamine, poly-allylamine, N,N-dimethylaminoethyl acrylate, N,N-dimethylaminopropylacrylamide and the like. Of these, N,N-dimethylaminoethyl acrylate and N,N-dimethylaminopropylacrylamide are particularly preferred.

From the viewpoints of dispersion stability and print stability, the content of monomer B) in the vinyl polymer is preferably from 3 to 40% by weight, and more preferably from 5 to 30% by weight.

(3) Monomer C);

Monomer C) is a styrenic macromer having a number average molecular weight of 500 to 500,000.

Preferred examples of the macromers include a macromer having a polymerizable functional group on one end thereof and having a number average molecular weight of 500 to 500,000, preferably 1,000 to 10,000.

Specific examples of the macromers include a styrenic macromer having a polymerizable functional group on one end thereof, a styrene-acrylonitrile-based macromer having a polymerizable functional group on one end thereof, and the like. Of these, the styrenic macromer having a polymerizable functional group on one end thereof is preferred, because the vinyl polymer can be satisfactorily contained together with the coloring agent.

Monomers other than styrene constituting the styrenic macromer having a polymerizable functional group on one end thereof include acrylonitrile. The styrene content is preferably 60% by weight or more, and more preferably 70% by weight or more, from the viewpoint of satisfactorily encapsulating the pigment by the vinyl polymer.

Of the styrenic macromers having a polymerizable functional group on one end thereof, one having an acryloyloxy group or a methacryloyloxy group as the polymerizable functional group on one end thereof is preferred.

Commercially available styrenic macromers include, for example, AS-6, AN-6, AN-6S, HS-6S and HS-6 manufactured by Toagosei Co., Ltd., and the like.

The content of macromer C) in the vinyl polymer is preferably from 0.1 to 40% by weight, and more preferably from 1 to 30% by weight, from the viewpoints of water resistance and scratch resistance.

(4) Monomer D);

Monomer D) is one copolymerizable with the above-mentioned monomers A), B) and C), and specific examples thereof include, for example, a (meth)acrylic ester, an aromatic ring-containing monomer and a macromer. These can be used either alone or as a mixture of two or more thereof. From the viewpoints of water resistance and scratch resistance, it is preferred that Monomer D) contains at least one member selected from the group consisting of a aromatic ring-containing monomer and a macromer.

The (meth)acrylic esters include, for example, a (meth) acrylic ester in which an ester moiety is an alkyl group having 1 to 18 carbon atoms, such as methyl (meth)acrylate, ethyl (meth)acrylate, (iso)propyl (meth)acrylate, (iso or tertiary) butyl (meth)acrylate, (iso)amyl (meth)acrylate, cyclohexyl (meth)acrylate, benzyl (meth)acrylate, 2-ethylhexyl (meth) acrylate, (iso)octyl (meth)acrylate, (iso)decyl (meth)acrylate, (iso)dodecyl (meth)acrylate or (iso)stearyl (meth)acrylate. These can be used either alone or as a mixture of two or more thereof.

The terms "(iso or tertiary)" and "(iso)" described above mean both the case where these groups are present and the case where these groups are absent, and in the case where these groups are absent, it is indicated that the compounds are normal.

From the viewpoint of water resistance, the aromatic ring-containing monomer is preferably at least one selected from the group consisting of styrene, vinylnaphthalene, α-methylstyrene, vinyltoluene, ethylvinylbenzene, 4-vinylbiphenyl, 1,1-diphenylethylene, benzyl (meth)acrylate, phenoxyethyl (meth)acrylate, 2-hydroxy-3-phenoxypropyl acrylate, 2-methacryloyloxyethyl-2-hydroxypropyl phthalate, 2-acryloyloxyethylphthalic acid and neopentyl glycol acrylate benzoate. Of these, at least one selected from the group consisting of styrene, α-methylstyrene, vinyltoluene and vinylnaphthalene is more preferred from the viewpoints of water resistance and scratch resistance.

The amounts of the above monomers A), B), C) and D) present in the vinyl monomer prepared by polymerizing these monomers are from 5 to 45% by weight (preferably from 5 to 35% by weight) for monomer A), from 3 to 40% by weight (preferably from 5 to 30% by weight) for monomer B), from 0.1 to 40% by weight (preferably 10 to 30% by weight) for monomer C), and from 0 to 87% by weight (preferably from 0 to 75% by weight) for monomer D).

The weight average molecular weight of the vinyl polymer is preferably from 3,000 to 300,000, and more preferably from 5,000 to 200,000, from the viewpoints of print density and print stability.

(Preparation of Dispersion of Pigment-Encapsulating Polymer Particles)

The pigment dispersion in which the above-mentioned vinyl polymer is used as a dispersing agent can be prepared, for example, by the method described in JP-A-2001-247810. For example, it can be preferably prepared by the following steps. That is to say, the method comprises (1) the step of mixing a polymer solution in a water-soluble organic solvent, a pigment and optionally a neutralizing agent to prepare a solvent dispersion, (2) the transfer emulsification step of developing this dispersion in an aqueous phase to prepare an aqueous suspension, and (3) the step of removing by distillation the water-soluble organic solvent added in preparing the solvent dispersion to allow the pigment to be encapsulated in the polymer particles.

The neutralizing agent may be appropriately determined. Alkalis include tertiary amines such as trimethylamine and triethylamine, ammonia, sodium hydroxide and potassium hydroxide. Further, as acids, inorganic acids such as hydrochloric acid and sulfuric acid, and organic acids such as acetic acid, propionic acid, lactic acid, succinic acid, glycolic acid, gluconic acid and glyceric acid may be used.

The organic solvent is preferably a water-soluble organic solvent, and examples thereof include alcohols such as methanol, ethanol and isopropanol, ketones such as acetone, methyl ethyl ketone, diethyl ketone and methyl isobutyl ketone, ethers such as dibutyl ether, tetrahydrofuran and dioxane, and the like.

Further, a dispersing device is available in the step of encapsulating the pigment with the polymer, and a dispersing operation is carried out with a dispersing device such as a ball mill, a sand mill, an attritor, a roll mill, an agitator mill, a Henschel mixer, a colloid mill, an ultrasonic homogenizer, a jet mill or an angmill. More preferred examples thereof include a high-pressure homogenizer in which contamination with broken pieces of dispersing media and the like is less likely to occur. The particle size of the vinyl polymer particles thus obtained is preferably from about 25 to 250 nm, and more preferably, from about 30 nm to 175 nm.

The weight ratio of the pigment to the polymer for encapsulation is preferably from 5:95 to 95:5, and more preferably from 10:90 to 90:10. The amount of the pigment is preferably from 0.5 to 15% by weight, and more preferably from 1 to 10% by weight, in a form in which the pigment is encapsulated with the polymer but in terms of the pigment weight alone based on the total amount of the ink composition.

(Multivalent Metal Ion)

The ink composition according to the invention contains a multivalent metal ion from the viewpoint of realizing high color developing properties and high glossiness in a compatible state. The above-mentioned multivalent metal ion is preferably contained in an amount ranging from 3 to 500 ppm based on the total amount of the ink composition from the viewpoints of color developing properties on plain paper and glossiness on glossy paper, and more preferably in an amount ranging from 5 to 100 ppm from the viewpoint of realizing high color developing properties and high glossiness in a compatible state. The elementary species and content of the above-mentioned multivalent metal ion can be analyzed with an ICP mass spectrograph or the like.

Further, the above-mentioned multivalent metal ion is preferably a bivalent metal ion, and more preferably a calcium ion, from the viewpoints of storage stability and print stability.

There is no particular limitation on the addition method of the above-mentioned multivalent metal ion to the ink composition. For example, a hydroxide of the multivalent metal ion such as calcium hydroxide may be added, or the multivalent metal ion contained as a trace constituent of the constituents of the ink composition may be added to the ink composition together with the above-mentioned constituents.

The content of the multivalent metal ion contained as a trace constituent of the constituents of the ink composition can be precisely measured using an ICP mass spectrograph or the like, so that the content of the multivalent metal ion can be adjusted to the above-mentioned specific range by calculating the amount added from the amount of the multivalent metal ion contained in the constituents, followed by the addition thereof.

(Water)

The ink composition according to the invention comprises water as a main solvent. As the water, there can be used pure water such as ion exchanged water, ultrafiltrated water, water obtained by reverse osmosis or distilled water, or ultrapure water. Further, water which has been sterilized by ultraviolet irradiation, the addition of hydrogen peroxide, or the like is suitably used, because mold or bacteria can be prevented from being developed when the ink composition is stored for a long period of time.

(Water-Soluble Organic Solvent)

Further, from the viewpoints of adjustment of ink viscosity, print quality and securement of reliability, it is preferred that the ink composition according to the invention comprises a water-soluble organic solvent. More preferably, the ink composition further comprises at least one selected from the group consisting of a penetration accelerator, a wetting agent and a surfactant.

(Penetration Accelerator)

The ink composition according to the invention preferably comprises the penetration accelerator. The penetration accelerator has the function of enhancing wettability to a recording medium to accelerate penetrability, and particularly, an alkanediol and/or a glycol ether are preferred from the viewpoint of improved penetrability.

The alkanediols include, for example, 1,2-pentanediol, 1,2-hexanediol and the like.

The glycol ethers include, for example, ethylene glycol monomethyl ether, ethylene glycol monobutyl ether, diethylene glycol monomethyl ether, diethylene glycol monoethyl ether, diethylene glycol monobutyl ether, triethylene glycol monomethyl ether, triethylene glycol monoethyl ether, triethylene glycol monobutyl ether and the like.

One or two or more of these penetration accelerators can be used, and from the viewpoints of ink viscosity and penetrability, the content thereof in the ink composition is preferably from 1 to 20% by weight, and more preferably from 1 to 10% by weight.

(Wetting Agent)

The ink composition according to the invention preferably comprises the wetting agent. The wetting agent has the function of preventing ink from being dried to prevent clogging of a head of an ink jet printer, and particularly, from the viewpoint of improving prevention of clogging, a polyhydric alcohol is preferred.

Specific examples thereof include ethylene glycol, diethylene glycol, triethylene glycol, polyethylene glycol, polypropylene glycol, propylene glycol, butylene glycol, 1,2,6-hexanetriol, thiodiglycol, hexylene glycol, glycerol, trimethylolethane, trimethylolpropane and the like.

Further, as the other wetting agents, there can also be used urea, 2-pyrrolidone, N-methyl-2-pyrrolidone, 1,3-dimethyl-2-imidazolidinone, triethanolamine, a saccharide such as a sugar alcohol, and the like. One or two or more of these wetting agents can be used, and from the viewpoints of ink viscosity and the effect of preventing clogging, the content thereof in the ink composition is preferably from 0.1 to 30% by weight, and more preferably from 0.5 to 20% by weight.

(Surfactant)

The surfactant has the function of enhancing wettability to a recording medium to accelerate penetrability, and particularly, from the viewpoints of improved penetrability and inhibited foaming and bubble generation, a nonionic surfactant is preferred. Further, a nonionic surfactant of an acetylene glycol and/or a polysiloxane is more preferred.

The acetylene glycols preferably include, for example, an acetylene glycol-based surfactant represented by the following formula (IV):

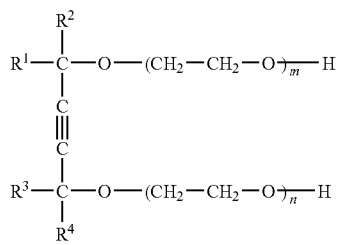

wherein $0 \leq m+n \leq 50$, and $R^1$ to $R^4$ each independently represents an alkyl group having 1 to 6 carbon atoms.

As the acetylene glycol-based surfactants represented by formula (IV) described above, there can be used commercially available ones. Examples thereof include Olfine Y, Surfynol 82, 440, 465, STG and E1010 (all are trade names, manufactured by Air Products and Chemicals Inc.) and the like, and particularly, Surfynol 465 is preferably used.

The polysiloxanes preferably include, for example, a polysiloxane-based surfactant represented by the following chemical formula (V);

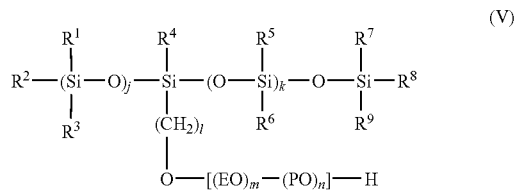

wherein $R^1$ to $R^9$ each independently represents an alkyl group having 1 to 6 carbon atoms, j and k each independently represents an integer of 1 or more, EO represents an ethyleneoxy group, PO represents a propyleneoxy group, and m and n each represents an integer of 0 or more, provided m+n represents an integer of 1 or more, and the form of addition of EO and PO in brackets may be either block addition or random addition, irrespective of their order.

As the polysiloxane-based surfactants represented by formula (V) described above, there can be used commercially available ones, for example, BYK348 (manufactured by Bic Chemie Japan Corp.) and the like.

Further, as the other surfactants, there can also be used various surfactants such as a cationic surfactant, an anionic surfactant and a nonionic surfactant.

One or two or more of these surfactants can be used, and from the viewpoints of ink viscosity, improved penetrability and inhibited foaming and bubble generation, the content thereof in the ink composition is preferably from 0.01 to 5.0% by weight, and more preferably from 0.1 to 3.0% by weight.

(pH Adjuster)

The ink composition according to the invention preferably further comprises a pH adjuster. The inclusion of the pH adjuster not only improves storage stability of the ink but also prevents the ink from rapidly changing in pH on a recording medium to give the function of enhance glossiness. In particular, from the viewpoints of the prevention of an adverse affect to printer constituent members and improved storage stability and glossiness of the ink composition, it is preferred to contain an alkali metal hydroxide and/or an alkanolamine.

The alkali metal hydroxide include lithium hydroxide, potassium hydroxide, sodium hydroxide and the like.

The alkanolamines include triethanolamine, monoethanolamine, diethanolamine, dimethylethanolamine, diethylethanolamine and the like.

One or two or more of these pH adjusters can be used.

In the ink composition according to the invention, it is preferred that the pH of the ink composition is adjusted to 8.0 to 11.0 by adding the pH adjuster. The adjustment of the pH of the ink composition to such a range can prevent the adverse affect to the members constituting a printer, and improve storage stability and glossiness of the ink composition. Accordingly, the amount of the pH adjuster added is preferably such an amount that the pH of the ink composition is adjusted to 8.0 to 11.0.

(Other Components)

To the ink composition according to the invention, there may be added a pH buffer, an antioxidant, an ultraviolet absorber, a preservative or fungicide, a chelating agent and the like, as needed.

Specific examples of the pH buffers include collidine, imidazole, phosphoric acid, 3-(N-morpholino)propanesulfonic acid, tris(hydroxymethyl)aminomethane, boric acid and the like.

Specific examples of the antioxidants or ultraviolet absorbers include allophanates such as allophanate and methyl allophanate; biurets such as biuret, dimethyl biuret and tetramethyl biuret; L-ascorbic acid and salts thereof; Tinuvin 328, 900, 1130, 384, 292, 123, 144, 622, 770 and 292, Irgacor 252 and 153, and Irganox 1010, 1076, 1035 and MD 1024, manufactured by Ciba-Geigy Corporation; lanthanide oxides; and the like.

Specific examples of the preservatives or fungicides include sodium benzoate, pentachlorophenol sodium, sodium 2-pyridinethiol-1-oxide, sodium sorbate, sodium dehydroacetate, and 1,2-dibenzisothiazolin-3-one (Proxel CRL, Proxel BDN, Proxel GXL, Proxel XL-2 and Proxel TN manufactured by Avecia) and the like.

Specific examples of the chelating agents include ethylenediaminetetraacetic acid (EDTA).

(Preparation of Ink Composition)

The ink composition according to the invention may be prepared by feeding the above-mentioned components into a dispersing/mixing device (for example, a ball mill, a sand mill, an attritor, a basket mill or a roll mill) to disperse them. According to a preferred embodiment of the invention, an original ink solution obtained by using the dispersing/mixing device is preferably filtered through a filter such as a membrane filter or a mesh filter to remove coarse particles.

(Ink Jet Recording Method and Recorded Matter)

Although can be suitably used for writing things such as pens, stamps and the like, the ink composition according to the invention can be more suitably used as ink compositions for ink jet recording. The term "ink jet recording system" as used in the invention means a system of ejecting an ink composition as droplets from a fine nozzle and depositing the droplets on a recording medium. The ink jet recording systems will be concretely described below.

As the first method, there is an electrostatic attraction system. This system is a system of applying a strong electric field between a nozzle and an accelerating electrode positioned in front of the nozzle to continuously eject the ink in a droplet form from the nozzle and giving a print information signal to deflecting electrodes while the ink droplets are flying between the deflecting electrodes, thereby performing printing, or a system of ejecting ink droplets in response to a print information signal without deflecting the course of the ink droplets.

The second method is a system of applying pressure to an ink liquid by means of a small-sized pump and vibrating mechanically a nozzle by using a quartz oscillator, thereby forcibly ejecting ink droplets. The ink droplets ejected are electrostatically charged, simultaneously with the ejection, and an information signal is given to deflecting electrodes while the ink droplets are flying between the deflecting electrodes, thereby performing printing.

The third method is a system using a piezoelectric element, and a system of simultaneously applying pressure and a print information signal to an ink liquid with the piezoelectric element, thereby ejecting ink droplets to perform recording, The fourth method is a system of rapidly expanding the volume of an ink liquid by the action of thermal energy, and a system of heating the ink liquid at a microelectrode according to a print information signal to produce bubbles, thereby ejecting ink droplets to perform recording.

All of the above systems can be used in the ink jet recording method using the ink of the invention.

The recorded matter of the invention is one in which recording has been performed using at least the above-mentioned ink composition. This recorded matter provides high-quality printed images by using the ink composition of the invention, and particularly, shows printed images excellent in color developing properties to plain paper and glossiness to glossy paper.

EXAMPLES

The invention will be illustrated in greater detail with reference to the following examples, but the invention should not be construed as being limited thereto.

(Preparation of Vinyl Polymer)
Monomers of the following compositions were prepared.

| | |
|---|---|
| Polypropylene glycol monomethacrylate (a compound in which o = 9, $R^1$ is a methyl group and $R^2$ is a hydrogen atom in formula (I), trade name: BLEMMER PP-500, manufactured by NOF Corporation) | 15% by weight |
| Polyethylene glycol monomethacrylate (a compound in which o = 23 and $R^1$ and $R^2$ are methyl groups in formula (III), trade name: NK ESTER M230G, manufactured by Shin-Nakamura Chemical Co., Ltd.) | 10% by weight |
| Methacrylic acid | 14% by weight |
| Styrene monomer | 46% by weight |
| Styrene macromer (a styrene-acrylonitrile co-macromer, number average molecular weight: 6000, polymerizable functional group; methacryloyl group, trade name: AS-6S, manufactured by Toagosei Co., Ltd.) | 15% by weight |

A reaction vessel was charged with 20% by weight of methyl ethyl ketone, 0.03% by weight of a polymerization chain transfer agent (2-mercaptanethanol) and 10% of the total amount of the above-mentioned monomers, followed by mixing. Then, the air in the vessel was replaced with nitrogen gas. On the other hand, a dropping equipment was charged with the remaining 90% of the above-mentioned monomer compositions. Subsequently, 0.27% by weight of the polymerization chain transfer agent (2-mercaptanethanol), 60% by weight of methyl ethyl ketone and 2,2'-azobis(2,4-dimethylvaleronitrile) were added to the dropping equipment, followed by mixing. Thereafter, the air in the dropping equipment was replaced with nitrogen gas. The temperature of the mixture in the reaction vessel was elevated to 65° C. with stirring under an atmosphere of nitrogen, and the mixture in the dropping equipment was added dropwise to the reaction vessel over 3 hours. After an elapse of 2 hours after the termination of dropping at 65° C., a solution of 0.3% by weight of 2,2'-azobis(2,4-dimethylvaleronitrile) in 5% by weight of methyl ethyl ketone was added thereto. The mixture was aged at 65° C. for 2 hours, and further at 70° C. for 2 hours to obtain a polymer solution.

The polymer solution obtained as described above was partially distilled under reduced pressure to remove the solvent, followed by drying to isolate the polymer.

The weight average molecular weight thereof was determined by gel permeation chromatography using polystyrene as a standard material, and phosphoric acid having a concentration of 60 mmol/L and dimethylformamide containing 50 mmol/L of lithium bromide as solvents. As a result, the weight average molecular weight was 70,000.

(Preparation of Pigment Dispersions)
(Pigment Dispersion M1)

The vinyl polymer (5% by weight) obtained above was dissolved in 45% by weight of methyl ethyl ketone, and a neutralizing agent (20% aqueous sodium hydroxide solution) was added thereto in a specified amount to completely neutralize salt-forming groups. Further, 20% by weight of C.I. Pigment Violet 19 was added as a pigment, followed by kneading in a bead mill for 2 hours. Then, 120% by weight of ultrapure water was added to the kneaded product obtained above, followed by stirring. Thereafter, methyl ethyl ketone was removed under reduced pressure at 60° C., and further, water was partially removed, thereby obtaining pigment dispersion M1 having a solid concentration of 20% by weight. This pigment dispersion M1 was subjected to ICP mass spectrometry of calcium using an SPQ9400 mass spectrograph (trade name, manufactured by Seiko Instruments Inc.). As a result, it was 240 ppm based on the total amount of the pigment dispersion.

(Pigment Dispersion M2)
A pigment dispersion was prepared in the same manner as with pigment dispersion M1 with the exception that the purity of ultrapure water was changed, thereby obtaining pigment dispersion M2. The calcium content of this pigment dispersion M2 was measured in the same manner as described above. As a result, it was 100 ppm based on the total amount of the pigment dispersion.

(Pigment Dispersion M3)
A pigment dispersion was prepared in the same manner as with pigment dispersion M1 with the exception that the purity of ultrapure water was changed, thereby obtaining pigment dispersion M3. The calcium content of this pigment dispersion M2 was measured in the same manner as described above. As a result, it was 5 ppm based on the total amount of the pigment dispersion.

(Preparation of Ink Compositions)
Respective components were mixed in ratios shown in the following Table 1, and stirred at room temperature for 2 hours. Then, filtration was performed using a MEMBRANE FILTER (trade name, manufactured by Nihon Millipore, Ltd.) having a pore size of about 8 μm to prepare respective ink compositions of Examples 1 to 4 and Comparative Examples 1 and 2. The calcium content in each ink composition was measured using an SPQ9400 mass spectrograph. The results thereof are shown in Table 1. The amounts added shown in Table 1 are all indicated in percentages by weight. Further, the term "balance" of ultrapure water means that ultrapure water is added to bring the total amount of ink to 100% by weight.

measured using a glossmeter, GM-268 (trade name, manufactured by Konica Minolta Sensing, Inc.), and evaluated on the basis of the following criteria:

A: The glossiness at 20 degrees was 60 or more.
B: The glossiness at 20 degrees was from 55 to less than 60.
C: The glossiness at 20 degrees was from 50 to less than 55.
D: The glossiness at 20 degrees was less than 50.

(Evaluation 3: Print Stability)

TABLE 1

| Ink Composition | Example 1 | Example 2 | Example 3 | Example 4 | Comparative Example 1 | Comparative Example 2 |
| --- | --- | --- | --- | --- | --- | --- |
| Pigment Dispersion M1 | 40 | — | 5 | — | 40 | — |
| Pigment Dispersion M2 | — | 40 | 35 | — | — | — |
| Pigment Dispersion M3 | — | — | — | 40 | — | 40 |
| Glycerol | 17 | 17 | 17 | 17 | 17 | 17 |
| 2-Pyrrolidone | 2 | 2 | 2 | 2 | 2 | 2 |
| Triethanolamine | 1 | 1 | 1 | 1 | 1 | 1 |
| Triethylene Glycol Monobutyl Ether | 1 | 1 | 1 | 1 | 1 | 1 |
| 1,2-Hexanediol | 3 | 3 | 3 | 3 | 3 | 3 |
| Surfynol 104PG50 | 0.2 | 0.2 | 0.2 | 0.2 | 0.2 | 0.2 |
| Olfine E1010 | 0.6 | 0.6 | 0.6 | 0.6 | 0.6 | 0.6 |
| Calcium Hydroxide (20,000 ppm aqueous solution) | — | — | — | 0.4 | 5 | — |
| Ultrapure Water | Balance | Balance | Balance | Balance | Balance | Balance |
| pH of Ink Composition | 8.9 | 8.9 | 9.0 | 9.1 | 9.2 | 8.9 |
| Ca Content in Ink Composition (ppm) | 96 | 40 | 47 | 82 | 1096 | 2 |

(Evaluations of Ink Compositions)

For the resulting ink compositions, the tests described below were conducted. The results thereof are shown in the following Table 2.

TABLE 2

|  | Example 1 | Example 2 | Example 3 | Example 4 | Comparative Example 1 | Comparative Example 2 |
| --- | --- | --- | --- | --- | --- | --- |
| Print Density on Plain Paper | A | A | A | A | A | C |
| Glossiness on Glossy Paper | A | A | A | A | A | B |
| Print Stability | A | A | A | A | C | A |
| Ink Storage Stability | A | A | A | A | C | A |

(Evaluation 1: Color Developing Property on Plain Paper)

Using an ink jet printer, PX-G900 (trade name, manufactured by Seiko Epson Corporation), monochromatic solid printing was performed on commercially available copying paper. After standing at 25° C. for 24 hours, the print density of a recorded area was measured using Spectrolino (trade name, manufactured by Gretag Macbeth), and evaluated on the basis of the following criteria;

A: The print density was 1.2 or more.
B: The print density was from 1.1 to less than 1.2.
C: The print density was from 1.0 to less than 1.1.
D: The print density was less than 1.0.

(Evaluation 2: Glossiness)

Using an ink jet printer, PX-G900 (trade name, manufactured by Seiko Epson Corporation), monochromatic solid printing was performed on Photo Paper <Gloss> (trade name, manufactured by Seiko Epson Corporation). After standing at 25° C. for 24 hours, the glossiness of a recorded area was Using an ink jet printer, PX-A550 (trade name, manufactured by Seiko Epson Corporation), continuous printing was performed under the environment of a temperature of 40° C. for a long period of time. The presence or absence of dot missing and ink scattering in printing was observed, and evaluated on the basis of the following criteria:

A; Dot missing or ink scattering did not occur even after an elapse of 4 hours.
B: Dot missing or ink scattering was observed after an elapse of 3 hours.
C: Dot missing or ink scattering was observed after an elapse of 2 hours.
D: Dot missing or ink scattering occurred before an elapse of 1 hour.

(Evaluation 4: Ink Storage Stability)

Fifty milliliters of each ink composition obtained was put in a sample bottle, and the bottle was sealed hermetically, followed by standing at 60° C. for 2 weeks. The presence or absence of foreign matter generation before and after the standing and the change in ink viscosity therebetween were observed, and evaluated on the basis of the following criteria:

A: No foreign matter generation was observed, and the change in viscosity was less than 0.1 mPa·s.
B: No foreign matter generation was observed, and the change in viscosity was from 0.1 to less than 0.3 mPa·s.
C: Foreign matter generation was observed, and the change in viscosity was less than 0.3 mPa·s.
D: Foreign matter generation was observed, and the change in viscosity was 0.3 mPa·s or more.

As is apparent from Table 2, according to the ink compositions of the invention, excellent color developing properties on plain paper and excellent glossiness can be obtained at the same time, while satisfying storage stability.

Further, when the ink composition of the invention is used as an ink for ink jet printing, high reliability is obtained in using it for ink jet recording, because of its excellent storage stability and print stability. Furthermore, the ink composition of the invention is good in quality of recorded images, and particularly, can provide recorded matter of plain paper images having excellent color developing properties and glossy paper images having excellent glossiness.

While the present invention has been described in detail and with reference to specific embodiments thereof, it will be apparent to one skilled in the art that various changes and modifications can be made therein without departing from the spirit and scope thereof.

This application is based on Japanese Patent Application No. 2005-100118 filed Mar. 30, 2005, the contents thereof being herein incorporated by reference.

What is claimed is:

1. An ink composition comprising at least a pigment, a polymer which encapsulates the pigment to make the pigment dispersible in the ink composition, a multivalent metal ion and water, wherein the polymer is a vinyl polymer obtained by polymerizing:

A) at least one monomer selected from the group consisting of:

monomer A1 represented by formula (I):

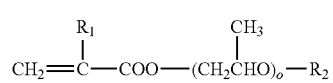

wherein $R^1$ represents a hydrogen atom or a methyl group, $R^2$ represents a hydrogen atom, an alkyl group having 1 to 20 carbon atoms or an alkylphenyl group having 1 to 9 carbon atoms, and o represents a number of 1 to 30;

monomer A2 represented by formula (II):

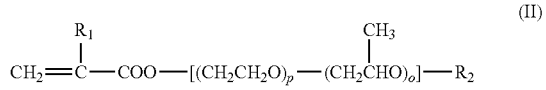

wherein $R^1$, $R^2$ and o have the same meanings as defined in formula (I), p represents a number of 1 to 30, the form of addition of oxyethylene groups and oxypropylene groups in brackets may be either block addition or random addition; and monomer A3 represented by formula (III):

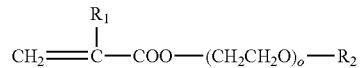

wherein $R^1$, $R^2$ and o have the same meanings as defined in formula (I);

B) a monomer having a salt-forming group;

C) a macromer having a number average molecular weight of 500 to 500,000, wherein the macromer is a styrenic macromer having a polymerizable functional group at one end thereof; and D) a monomer copolymerizable with the monomers A), B) and C), and wherein the multivalent metal ion is calcium and is present in an amount of from 5 to 100 ppm based on the total amount of the ink composition.

2. The ink composition according to claim 1, wherein the vinyl polymer has a weight average molecular weight of 3,000 to 300,000.

3. The ink composition according to claim 1, wherein the pigment is C.I. Pigment Violet 19.

4. The ink composition according to claim 1, wherein the composition further comprises at least one member selected from the group consisting of a penetration accelerator, a wetting agent and a surfactant.

5. The ink composition according to claim 4, wherein the penetration accelerator comprises at least one of an alkanediol and a glycol ether.

6. The ink composition according to claim 4, wherein the wetting agent is a polyhydric alcohol.

7. The ink composition according to claim 4, wherein the surfactant is a nonionic surfactant which comprises at least one of an acetylene glycol and a polysiloxane.

8. The ink composition according to claim 1, wherein the composition further comprises at least one of an alkali metal hydroxide and an alkanolamine as a pH adjuster.

9. An ink jet recording method comprising ejecting droplets of an ink composition and allowing the droplets to adhere to a recording medium to perform printing, wherein the ink composition is the ink composition according to claim 1.

10. Recorded matter recorded by the ink jet recording method according to claim 9.

* * * * *